United States Patent

Lander et al.

[11] Patent Number: 6,069,876
[45] Date of Patent: May 30, 2000

[54] PERFORMANCE MONITORING OF AN ATM NETWORK

[75] Inventors: Emil Lander, Nepean; Stephen D. Cadieux, Kanata, both of Canada

[73] Assignee: Nortel Networks Corporation, Montreal, Canada

[21] Appl. No.: 08/798,752

[22] Filed: Feb. 13, 1997

[51] Int. Cl.[7] .................................................. G01R 31/08
[52] U.S. Cl. ........................................... 370/249; 370/395
[58] Field of Search ................................... 370/232, 233, 370/234, 248, 249, 253, 395; 371/20.5, 20.4, 5.1; 375/224

[56] References Cited

U.S. PATENT DOCUMENTS

| | | | |
|---|---|---|---|
| 4,271,514 | 6/1981 | Parras et al. | 370/249 |
| 4,920,537 | 4/1990 | Darling et al. | 371/5.1 |
| 5,313,453 | 5/1994 | Uchida et al. | 370/248 |
| 5,384,774 | 1/1995 | Martin et al. | 370/82 |
| 5,392,314 | 2/1995 | Wolf | 375/224 |
| 5,404,380 | 4/1995 | Powel et al. | 375/363 |
| 5,450,394 | 9/1995 | Gruber et al. | 370/253 |
| 5,457,700 | 10/1995 | Merchant | 371/27 |

FOREIGN PATENT DOCUMENTS 0 667 694  8/1995  European Pat. Off. ........ H04L 12/26

OTHER PUBLICATIONS

Duff, J.A., "Test Challenges of ATM", Annual Review of Communcations, vol. 46, Jan. 1, 1993, pp. 320–328.
Keiser, G. et al., "Test Traffic Generation Equipment and Algorithms for Evaluating ATM Networks", Computer Communications, vol. 19, No. 12, Oct. 1996, pp. 962–971.
Farkouh, S.C., "Managing ATM–Based Broadband Networks", IEEE Communications Magazine, vol. 31, No. 5, May 1, 1993, pp. 82–86.
Hideyo, M. et al., "Monitoring Method for Cell Transfer Performance in ATM Networks", NTT Review, vol. 4, No. 4, Jul. 1, 1992, pp. 38–44.

*Primary Examiner*—Jason Chan
*Assistant Examiner*—Alexander Boakye
*Attorney, Agent, or Firm*—Gowling, Strathy & Henderson; Yoshiharll Toyooka

[57] ABSTRACT

Telecommunications networks require a variety of tests to monitor their proper operations. Performance monitoring (and fault detection) of the physical layer of a transmission system is one of them and is usually accomplished by using a bit error rate test (BERT). The BERT of the invention uses modified ATM idle cells to conduct one-way, bidirectional and loopback BERT. ATM idle cells are loaded with BERT data at the transmit end and recovered at the receive end. The BERT data are processed according to the different data rates of the ATM transmission system. Performance parameters are derived from the received BERT data. The disclosure describes a method as well as a system for performing such a test.

10 Claims, 5 Drawing Sheets

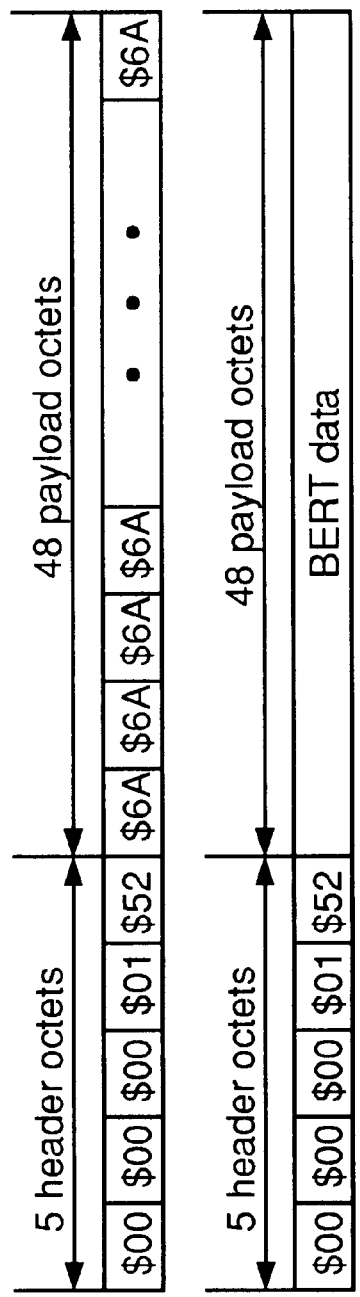
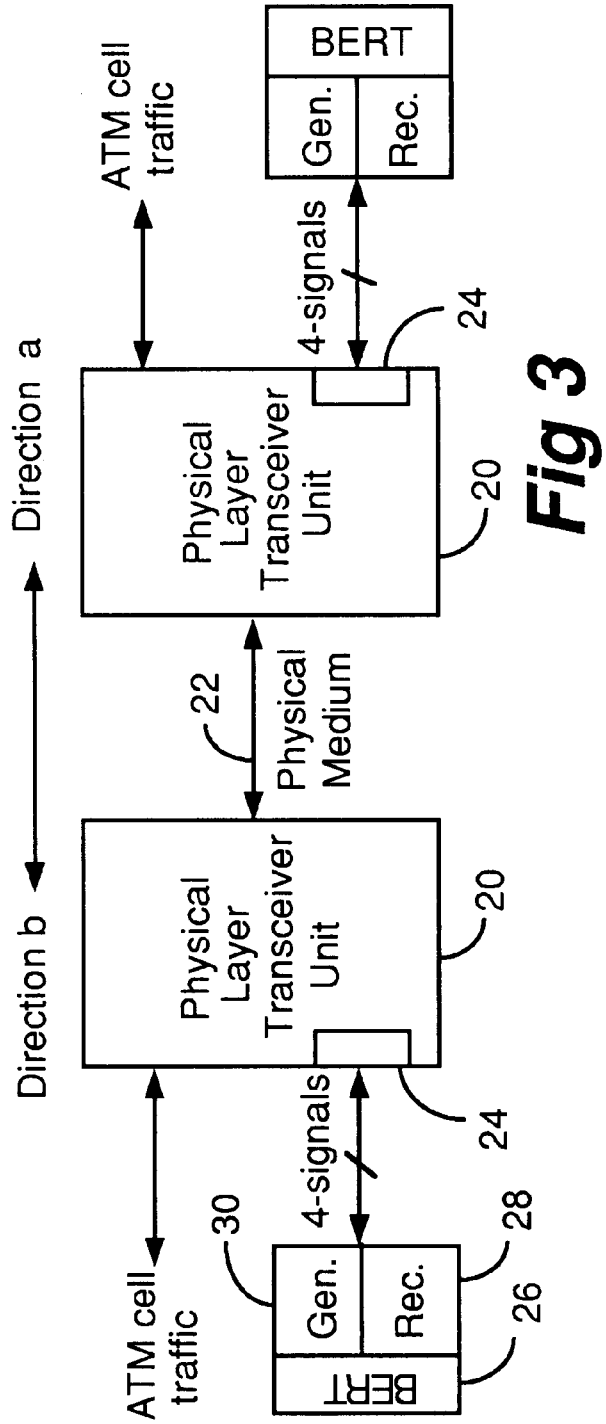

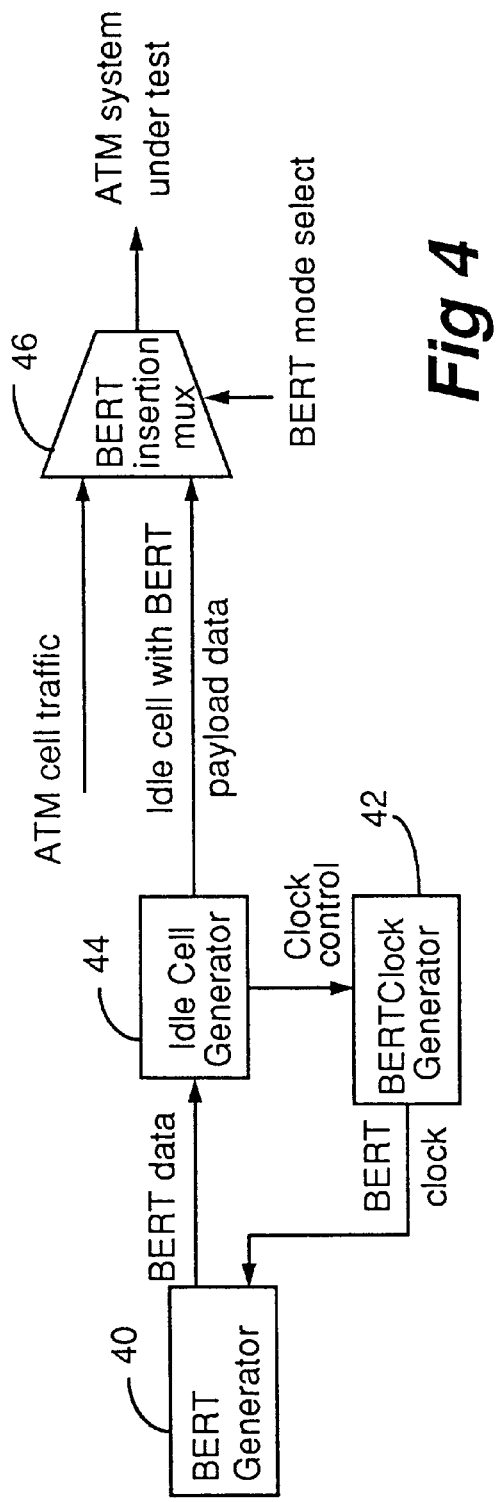
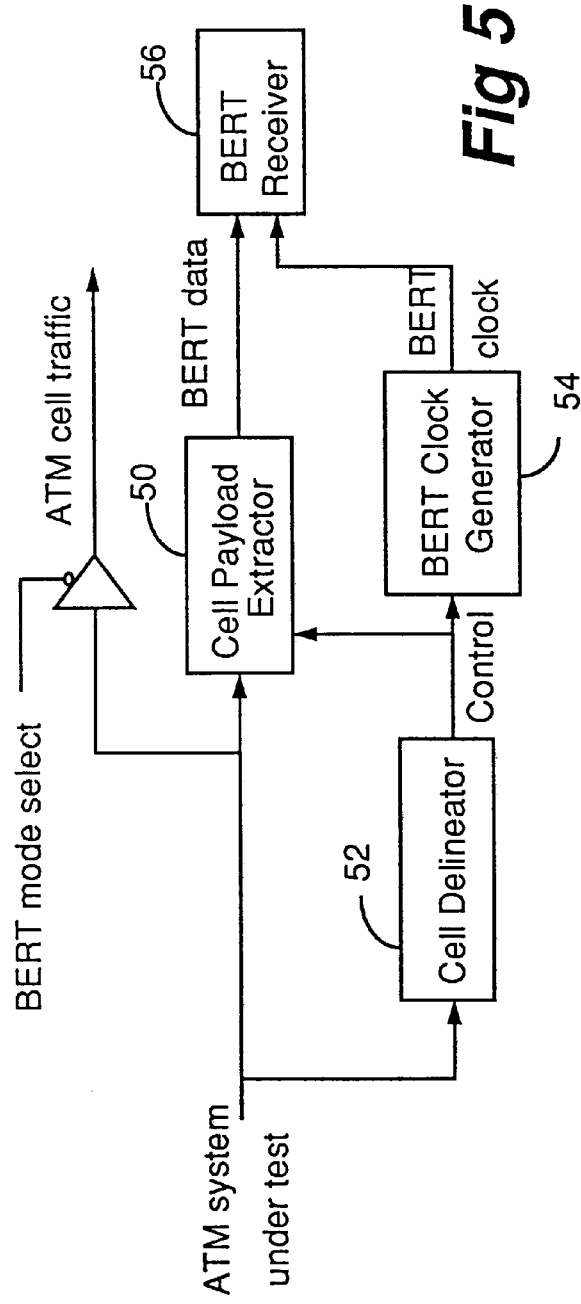
Fig 4
Fig 5

PERFORMANCE MONITORING OF AN ATM NETWORK

FIELD OF INVENTION

The invention generally relates to a performance test of a telecommunications network. In particular, it is directed to a technique of measuring performance parameters of such a network.

BACKGROUND OF INVENTION

Telecommunications networks require a variety of methods to monitor the system performance. One common method of performance monitoring and fault detection of the physical layer of a transmission system is the bit error rate test (BERT). BERT is conducted in the direction of transmission but there are several modes of BERT. In order to sectionalize performance faults, it is useful to verify one-way error rate performance (i.e. from the transmit-end to the receiver-end, called one-way BERT). There is also bidirectional BERT in which one-way BERT is conducted in two opposite directions simultaneously. Another mode is a loopback test (called loopback BERT) in which a looped back performance test is originated from either end of the system with a loopback established at the opposite end of the system.

There are some standard bit error rate test sets available in the art. These commercially available BERT sets contain a generator section and a receiver section. The generator section outputs a serialized data pattern which may be fixed or pseudo-randomized. The receiver section receives a serialized data pattern and verifies it for errors with respect to an expected receive pattern. The generator and receiver sections generally operate independently allowing one-way testing using two BERT sets or looped back testing using a single BERT set. The BERT receiver section also usually contains performance monitoring capabilities by providing error statistics. The BERT set normally provides various interfaces for connection to the generated and received data.

This invention allows the use of a standard bit error rate test set for monitoring the performance of the physical layer of an ATM cell-based transmission system by using a simple 4-signal interface consisting of data to the BERT receiver, data from the BERT generator, and clocks to the generator and the receiver (2 clocks). The invention utilizes the idle cell structure of the physical layer to transport BERT data to conduct a transmission performance test.

OBJECTS OF INVENTION

It is therefore an object of the invention to provide a method of and system for monitoring the performance of an ATM network.

It is another object of the invention to provide a method of and system for monitoring the performance of an ATM network by using ATM idle cells.

It is a further object of the invention to provide a method of and system for conducting BERT on an ATM network.

It is still another object of the invention to provide a method of and system for conducting BERT on an ATM network in several different modes.

It is yet a further object of the invention to provide a method of and system for conducting BERT on an ATM network using ATM idle cells.

It is another object of the invention to provide a method of and system for conducting BERT on an ATM network in a mode with asymmetric system data rates.

SUMMARY OF INVENTION

Briefly stated, the invention is directed to a method of conducting a performance test in an ATM network. The method comprises steps of sending from a first node in the ATM network a series of ATM test cells which contain a series of bits arranged in a test pattern and receiving at a second node the series of ATM test cells. The method further includes a step of deriving a performance parameter of the network from the received test pattern. In one embodiment, the series of bits arranged in a test pattern are BERT data.

According to another aspect, the invention is directed to a method of conducting a transmission performance test between nodes in an ATM network. The method comprises steps of generating ATM idle cells, generating BERT data and inserting BERT data in one or more ATM idle cells to generate one or more modified ATM idle cells. The method further includes steps of sending the one or more modified ATM idle cells through the ATM network under test, receiving the one or more modified ATM idle cells, and deriving a transmission performance parameter of the network from received BERT data in the one or more received modified ATM idle cells.

According to yet a further aspect, the invention is directed to a system for conducting a performance test between nodes in an ATM network. The system comprises a test pattern generator for generating a series of bits arranged in a test pattern and an idle cell generator for generating a series of ATM idle cells and inserting therein the series of bits arranged in the test pattern to generate a series of modified ATM idle cells. The system also includes a test pattern insertion MUX for transmitting the series of modified ATM idle cells through the ATM network under test.

BRIEF DESCRIPTION OF THE DRAWINGS

FIG. 1 shows a standard ATM idle cell format;

FIG. 2 shows a modified ATM idle cell format according to an embodiment of the invention;

FIG. 3 is a block diagram of a BERT arrangement in one-way BERT mode according to one embodiment;

FIG. 4 is a schematic block diagram of a transmit end according to one embodiment;

FIG. 5 is a schematic block diagram of a receive end according to one embodiment;

DETAILED DESCRIPTION OF PREFERRED EMBODIMENTS OF THE INVENTION

Figure 6:
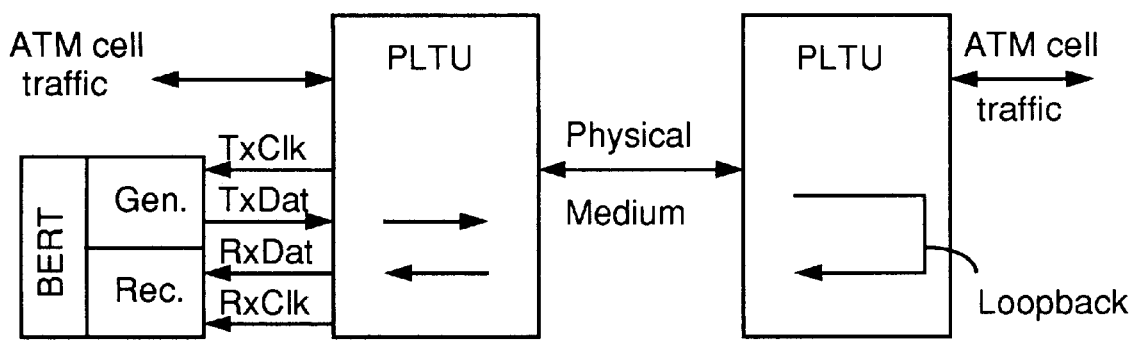
FIG. 6 is a block diagram of a BERT arrangement in a loopback mode according to one embodiment.

During ATM communication, idle cells are employed to decouple the ATM cell traffic rate from payload capacity of the specific transmission system used by the physical layer. In other words, the transmit end inserts idle cells into the data stream when no ATM cell traffic is available. The receive end detects the idle cells by decoding the unique header field and extracts them from the data stream without passing them to the ATM layer.

According to the present invention, BERT data are delivered to the ATM system under test by using a specially modified ATM idle cell. As shown in FIG. 1, a standard ATM idle cell consists of a fixed 5 octet header followed by a payload of 48 octets fixed with a value of $6A.

According to the embodiment, BERT data are substituted for the fixed 48 payload octets of the idle cell and are delivered to the system. Thus the modified idle cell appears as shown in FIG. 2. During BERT mode, the ATM cell traffic is interrupted and only the modified idle cells carrying BERT data are transmitted.

As described earlier BERT can be conducted in several modes and some preferred embodiments will be described in detail below.

One-Way BERT
Overview

One-way BERT is used to measure the physical layer one-way performance at each receiver of the transmission system. FIG. 3 illustrates schematically the configuration required for testing two simultaneous one-way performances. The Physical Layer Transceiver Units (PLTU) 20 are the equipment providing the physical layer functionality for the ATM cell traffic at both ends of a bidirectional transmission system through a physical medium 22, e.g. wire, fiber optic wireless, etc. Through a BERT interface 24, each PLTU is connected to a BERT set 26 providing test pattern generator 28 and receiver functions 30. For the bidirectional BERT, four interface signals are used between the BERT set and the PLTU at each end of the system. They are Tx Data, Tx Clk, Rx Data, Rx Clk. The following three one-way configurations are possible:

Direction a BERT, direction b normal ATM traffic;
Direction b BERT, direction a normal ATM traffic;
Bidirectional a and b BERT, no ATM traffic.

For PLTUs that provide independent data randomization or scrambling on the transmission loop, the pseudo-random patterns typically used for BERT are not necessary. In this case, the separate BERT generator functions are not required. During the BERT mode, the transmitted traffic consists of unmodified idle cells containing $6A data. The receiver is connected to a BERT set with a BERT receiver only, which is configured to compare the received data to the expected $6A pattern.

Instead of providing an interface to connect the ATM modems to external BERT sets, the BERT generator and receiver functions may be entirely implemented within the PLTUs. This would provide an integrated BERT capability providing self-contained BERT without the need for external test equipment.

FIG. 4 is a block diagram of a circuit used in the transmit end of the one-way BERT according to one embodiment. The figure includes BERT generator 40 which produces BERT data under control of a BERT clock signal from BERT clock generator 42. An idle cell generator 44 produces ATM idle cells and also inserts the BERT data generated by the BERT data generator in their payload fields to create modified idle cells. A BERT insertion MUX 46 halts ATM cell traffic and transmits the modified idle cells for an ATM system under test. One-way BERT can be performed in the ATM system in direction a or b, or both directions simultaneously, as shown in FIG. 3. At the transmit end, the source of BERT data is a commercially available BERT set which generates a self-synchronizing pseudo-random serial data pattern, according to a BERT clock provided by the circuit. The idle cell generator circuit receives cell boundary and timing information from the ATM system under test. It constructs the modified idle cell by producing the fixed header octets at the appropriate time in the system, then capturing BERT data from the BERT set and transmitting the data as the 48 payload octets. This process is repeated for the duration of the BERT test. For the case where a commercially available BERT set is not used at the transmit end, the idle cell generator constructs a standard ATM idle cell as shown in FIG. 1 and relies on the ATM system for randomization.

The BERT clock generator 42 produces a clock at the frequency of the direction a or b bit transmission rate ($r_a$ or $r_b$, respectively) of the ATM system under test. The idle cell generator 44 provides control signals to the BERT clock generator circuit to gap the BERT clock while header octets are produced and while other non-ATM overhead data are being transmitted by the system.

During the BERT test procedure, ATM traffic directed to the system under test is preempted by the modified idle cells from the idle cell generator. The BERT mode control signal 48 is used in conjunction with the BERT insertion MUX 46 to feed the output of the idle cell generator to the ATM system for the duration of the test.

Referring to FIG. 5, at the receive end, the modified idle cells are terminated by a circuit which includes a cell payload extractor circuit 50 which strips the cell header and extracts the payload under control of a cell delineator 52. A BERT clock generator 54 is also under control of a cell delineator. The cell payload extractor circuit extracts the payload BERT data and sends them to the BERT receiver. The BERT receiver can be a commercially available BERT set which is programmed to accept the same self-synchronizing pseudo-random serial data pattern that is being sent by the transmitting BERT set. In the case where no transmit BERT set is used, the receive BERT set is programmed to accept the standard ATM idle cell payload value of $6A.

Because bit errors may be present in the modified idle cell header, no assumptions are made regarding the contents of the header. Thus it is imperative that ATM traffic is suspended during the BERT test so that bit errors in the modified idle cell header are not misinterpreted as valid ATM traffic by the system. Accordingly, all received cells are treated as modified idle cells, thus the payload data of all received cells is transmitted to the BERT set.

Timing information for the circuit is provided by the ATM system under test. A cell delineator circuit recovers cell boundary information from the received data stream by using the Header Error Control field according to International Telecommunications Union Standard I.432. The cell delineator uses the cell boundary information to derive circuit control signals.

The modified idle cell payload containing the BERT data is extracted from the incoming cell stream based on control information provided from the cell delineator. The extracted BERT data is output from the circuit as a serial stream to the BERT set. The BERT set receives data according to a BERT clock provided by the BERT clock generator circuit. The frequency of the BERT clock is equal to that of the bit transmission rate of the ATM system under test. Control information from the cell delineator is used to gap the BERT clock during header octets and while other non-ATM data is being transmitted by the system.

Loopback BERT
Overview

For bidirectional transmission with symmetrical data rates in both directions, a loopback can be implemented by simply extracting the BERT data from the idle cells received at the far-end and inserting the same data into the transmitted idle cells. However, many transmission systems support asymmetrical transmission rates. For an asymmetrical system, a physical layer BERT using idle cells may be implemented by employing a lower payload rate that is common to both directions of transmission. One method to implement this is to use the highest common factor (HCF) rate between the two ATM payload rates. Let the transmission rate of direction a be r and the transmission rate for direction b be $r_b$.

For the case where $r_a$ is an integer multiple of $r_b$ or vice versa, HCF($r_a,r_b$) is simply the lower of the two rates. Therefore the loopback BERT uses a rate equal to the lower rate. For the case where $r_a$ and $r_b$ are not direct integer multiples of each other, the loopback BERT uses a rate equal to the highest common factor between the two rates, HCF ($r_a,r_b$). For example, a transmission rate of 1 Mbps would be used for a loopback BERT with a system providing asymmetrical payload rates of $r_a$=3 Mbps and $r_b$=2 Mbps.

FIG. 6 shows the configuration for loopback at the far-end to support testing with an external BERT set located at the other end. BERT may be performed from either end of the system.

Implementation

Figure 7:
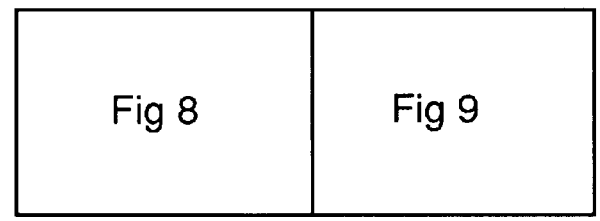
FIG. 7 shows a way to arrange FIGS. 8 and 9.
Figure 8:
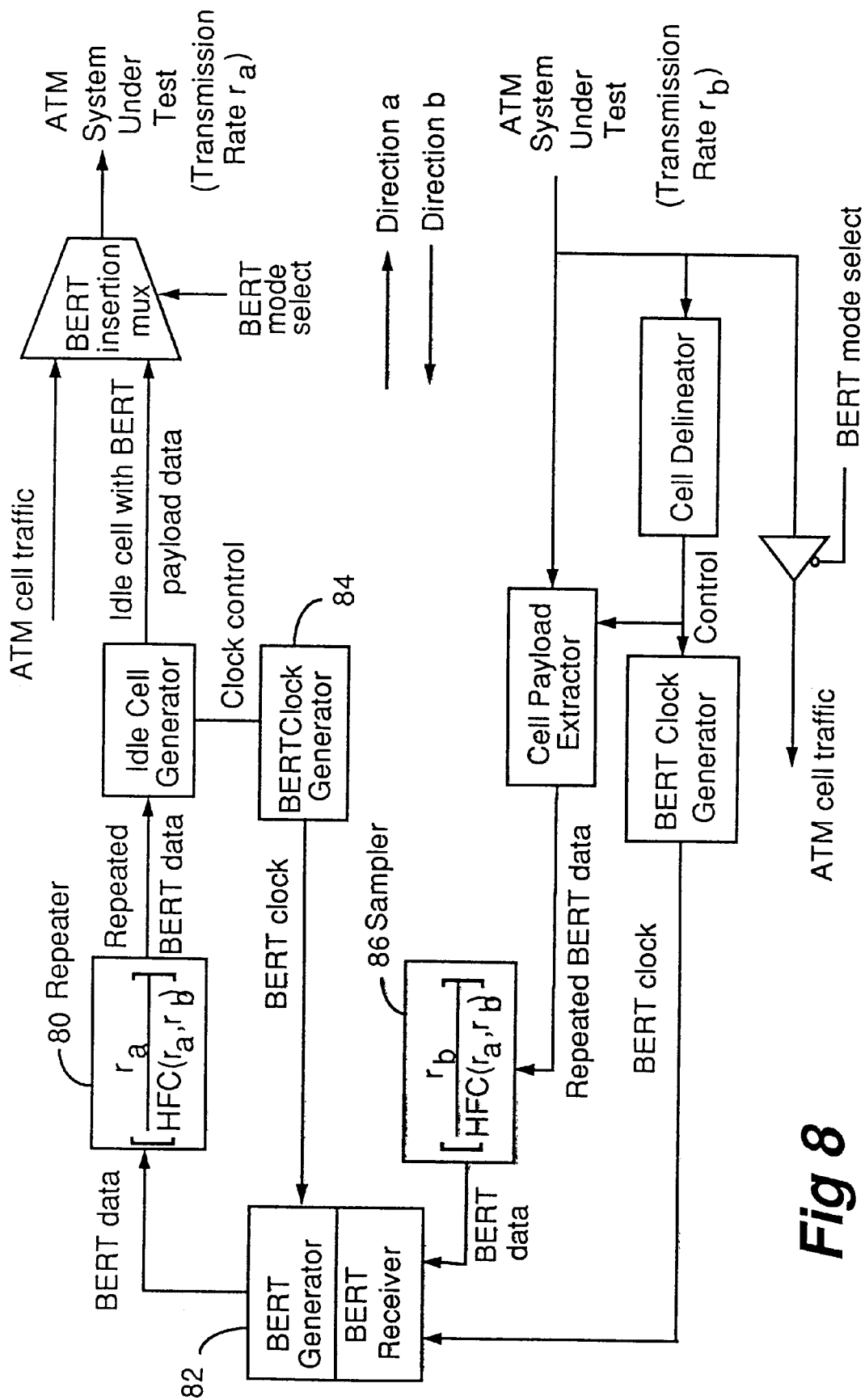
FIG. 8 is a schematic block diagram of a transmit-receive end in the loopback mode according to one embodiment.
Figure 9:
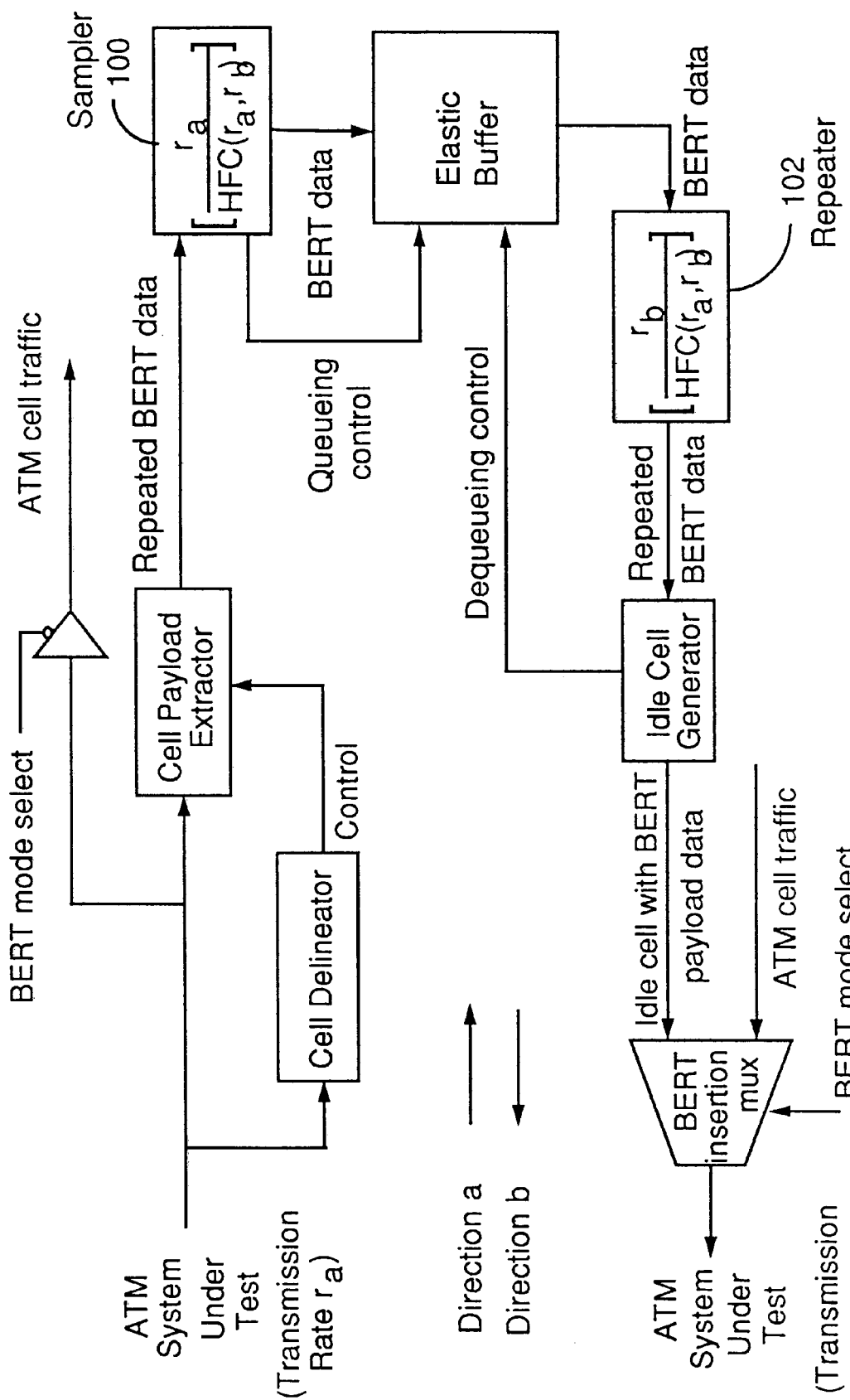
FIG. 9 is a schematic block diagram of a loopback end in the loopback mode according to one embodiment.

FIGS. 8 and 9 arranged in the fashion shown in FIG. 7 illustrate a block diagram of a circuit used to implement loopback BERT, according to one embodiment. This implementation requires transmit and receive circuits to be located at one end of the ATM system under test, with circuitry to loopback the BERT data at the far end.

The transmit circuit shown in FIG. 8 operates in an identical fashion to the one-way implementation described above except for the addition of a repeater circuit 80. The repeater functions to receive each bit from the BERT set 82 and repeat it by the factor $s_a$, where $$s_a = \frac{r_a}{HCF(r_a, r_b)}$$

The repeated bits are then presented to the idle cell generator which inserts them into the modified idle cell payload. The BERT clock generator 84 supplies a gapped clock to the BERT set at a rate of HCF($r_a,r_b$). For the case where a transmit BERT set is not used, the repeater generates the fixed $6A value with each bit repeated sa times.

At the loopback end shown in FIG. 9, the modified idle cells are terminated in the same manner as the one-way implementation except for the addition of a bit sampler 100 and loopback elastic buffer. Again, because bit errors may be present in the modified idle cell header, all received cells are treated as modified idle cells and all payload data are fed to the bit sampler. Also, ATM traffic is suspended during the BERT test so that bit errors in the modified idle cell header are not misinterpreted as valid ATM traffic by the system.

The bit sampler restores the data rate of HCF($r_a,r_b$) by sampling every $s_a$th bit from the extracted payload data, thus restoring the BERT data produced at the transmit end before the repeater circuit 102. The restored BERT data from the sampler is then queued into an elastic buffer 104. The buffer serves to re-time the BERT data to the return direction b data rate $r_b$. The elastic buffer must be sized to accommodate the maximum anticipated duration of non-payload traffic in both directions in the ATM system under test.

BERT data stored in the elastic buffer are dequeued under the control of the return transmit idle cell generator. The dequeued BERT data is again fed to a repeater circuit 102, which repeats each bit of the BERT data by the factor sb, where $$s_b = \frac{r_b}{HCF(r_a, r_b)}$$

The repeated BERT data is then presented to the idle cell generator 106 for insertion into modified idle cells for transmission on the return path of the ATM system under test. The receiver in the return path operates identically to the receiver at the loopback end. All received cells are terminated with no assumptions regarding the cell header contents and with ATM traffic suspended. The extracted payload is fed to a bit sampler circuit 86 which restores the data rate of HCF($r_a,r_b$) by sampling every $s_b$th bit from the extracted payload data, thus restoring the original BERT data.

The receive BERT set receives the restored data according to a BERT clock provided by the BERT clock generator circuit. The frequency of the BERT clock is equal to HCF($r_a,r_b$). Control information from the cell delineator is used to gap the BERT clock during header octets and while other non-ATM data are being transmitted by the system.

What is claimed is:

1. A method of conducting a transmission performance test of an ATM network at a node, wherein directions a and b are directions from the node and to the node respectively, and $r_a$ and $r_b$ are transmission rates for directions a and b respectively, comprising steps of:

generating ATM idle cells;

generating test pattern data;

inserting the test pattern data in one or more ATM idle cells to generate one or more modified ATM idle cells;

sending in one channel in direction a the one or more modified ATM idle cells through the ATM network under test;

receiving in another channel in direction b the one or more modified ATM idle cells;

deriving a transmission performance parameter of the network from received test pattern data in the one or more received modified ATM idle cells; and adjusting either one or both the test pattern data to be inserted by factor sand the test pattern data received by factor $s_b$;

where $s_a = \frac{r_a}{HCF(r_a, r_b)}$, $s_b = \frac{r_b}{HCF(r_a, r_b)}$ and HCF ($r_a,r_b$) is the highest common factor between $r_a$ and $r_b$.

2. The method of conducting a transmission performance test according to claim 1, comprising a further step of:

sampling the adjusted test pattern data by factor sa to generate the received test pattern data.

3. The method of conducting a transmission performance test according to claim 1, comprising a further step of:

sampling the adjusted test pattern data by factor $s_a$ to generate the received test pattern data.

4. A system for conducting a performance test between nodes in an ATM network, comprising:

a test pattern generator for generating a series of bits arranged in a test pattern;

an idle cell generator for generating a series of ATM idle cells and inserting therein the series of bits arranged in the test pattern to generate a series of modified ATM idle cells; and a test pattern insertion MUX for transmitting the series of modified ATM idle cells through the ATM network under test from a node in one channel;

a cell payload extractor circuit for extracting the series of modified ATM idle cells received at the node in another channel to generate a series of received bits arranged in the received test pattern;

an adjuster and a sampler for accommodating different transmission rates in the two channels; and a test pattern receiver for generating performance parameters from the series of received bits arranged in the received test pattern.

5. The system for conducting a performance test between nodes according to claim 4 wherein the test pattern generator comprises a BERT data generator.

6. The method of conducting a transmission performance test according to claim 1 wherein the test pattern data are BERT data.

7. The method of conducting a transmission performance test according to claim 2 wherein the step of adjusting the rates of test pattern data comprises a step of producing each data bit of test pattern data Sa times in the adjusted test pattern data.

8. The method of conducting a transmission performance test according to claim 7 wherein the test pattern data are BERT data.

9. The method of conducting a transmission performance test according to claim 3 wherein the step of adjusting the rates of test pattern data comprises a step of producing each data bit of test pattern data sb times in the adjusted test pattern data.

10. The method of conducting a transmission performance test according to claim 9 wherein the test pattern data are BERT data.

* * * * *